United States Patent
Kitaji

(10) Patent No.: US 11,817,710 B2
(45) Date of Patent: Nov. 14, 2023

(54) CONTROL APPARATUS AND CONTROL METHOD FOR CONTROLLING CHARGE AND DISCHARGE OF STORAGE BATTERY APPARATUSES

(71) Applicant: KYOCERA CORPORATION, Kyoto (JP)

(72) Inventor: Mitsuhiro Kitaji, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 10 days.

(21) Appl. No.: 17/265,808

(22) PCT Filed: Aug. 7, 2019

(86) PCT No.: PCT/JP2019/031047
§ 371 (c)(1),
(2) Date: Feb. 4, 2021

(87) PCT Pub. No.: WO2020/032082
PCT Pub. Date: Feb. 13, 2020

(65) Prior Publication Data
US 2021/0167602 A1     Jun. 3, 2021

(30) Foreign Application Priority Data

Aug. 7, 2018   (JP) ................................. 2018-148226

(51) Int. Cl.
*H02J 7/00*     (2006.01)
*H02J 3/32*     (2006.01)
(Continued)

(52) U.S. Cl.
CPC ............... *H02J 3/32* (2013.01); *G05B 15/02* (2013.01); *H02J 7/005* (2020.01); *H02J 7/0013* (2013.01);
(Continued)

(58) Field of Classification Search
USPC .................................................. 700/295, 291
See application file for complete search history.

(56) References Cited

U.S. PATENT DOCUMENTS

| | | | |
|---|---|---|---|
| 2013/0184882 A1* | 7/2013 | Momose | B60L 50/66 700/286 |
| 2014/0062195 A1* | 3/2014 | Bruschi | B60L 53/63 307/38 |

(Continued)

FOREIGN PATENT DOCUMENTS

| | | |
|---|---|---|
| EP | 3422516 A1 | 1/2019 |
| JP | 2003299251 A | 10/2003 |
| WO | 2017145462 A1 | 8/2017 |

*Primary Examiner* — Emilio J Saavedra
(74) *Attorney, Agent, or Firm* — HAUPTMAN HAM, LLP

(57) ABSTRACT

A control apparatus that controls charge and discharge of a plurality of storage battery apparatuses belonging to different consumer's facilities includes at least one processor. The at least one processor is configured to execute: a reception process of receiving a request of charge or discharge to a target storage battery apparatus included in the plurality of storage battery apparatuses, and an allocation process of allocating, to the storage battery apparatus other than the target storage battery apparatus out of the plurality of storage battery apparatuses, at least a part of a request charge and discharge amount that is a charge amount or discharge amount corresponding to the request received by the reception process, so as to suppress deterioration of the target storage battery apparatus.

12 Claims, 6 Drawing Sheets

(51) Int. Cl.
*H02J 13/00* (2006.01)
*G05B 15/02* (2006.01)

(52) U.S. Cl.
CPC ...... *H02J 7/0047* (2013.01); *H02J 13/00028* (2020.01)

(56) References Cited

U.S. PATENT DOCUMENTS

| | | | |
|---|---|---|---|
| 2014/0091753 A1* | 4/2014 | Yonezawa | H02J 7/0068 320/107 |
| 2015/0263546 A1* | 9/2015 | Senoo | H02J 7/0021 320/134 |
| 2017/0256945 A1* | 9/2017 | Hanada | H02J 7/007 |
| 2018/0072182 A1* | 3/2018 | Araki | B60L 58/15 |
| 2020/0021115 A1* | 1/2020 | Files | G06F 1/1618 |
| 2020/0083711 A1* | 3/2020 | Kanou | H02J 3/004 |

* cited by examiner

| STORAGE BATTERY APPARATUS ID | SOC | TEMPERATURE | SOH | REAL POWER STORAGE AMOUNT | VIRTUAL POWER STORAGE AMOUNT |
|---|---|---|---|---|---|
| | | | | | |

CHARGE AND DISCHARGE REQUEST MESSAGE

| CONTROL TIME | CONTROL CONTENT (CHARGE/ DISCHARGE) | CONTROL AMOUNT (kWh) |
|---|---|---|
| | | |

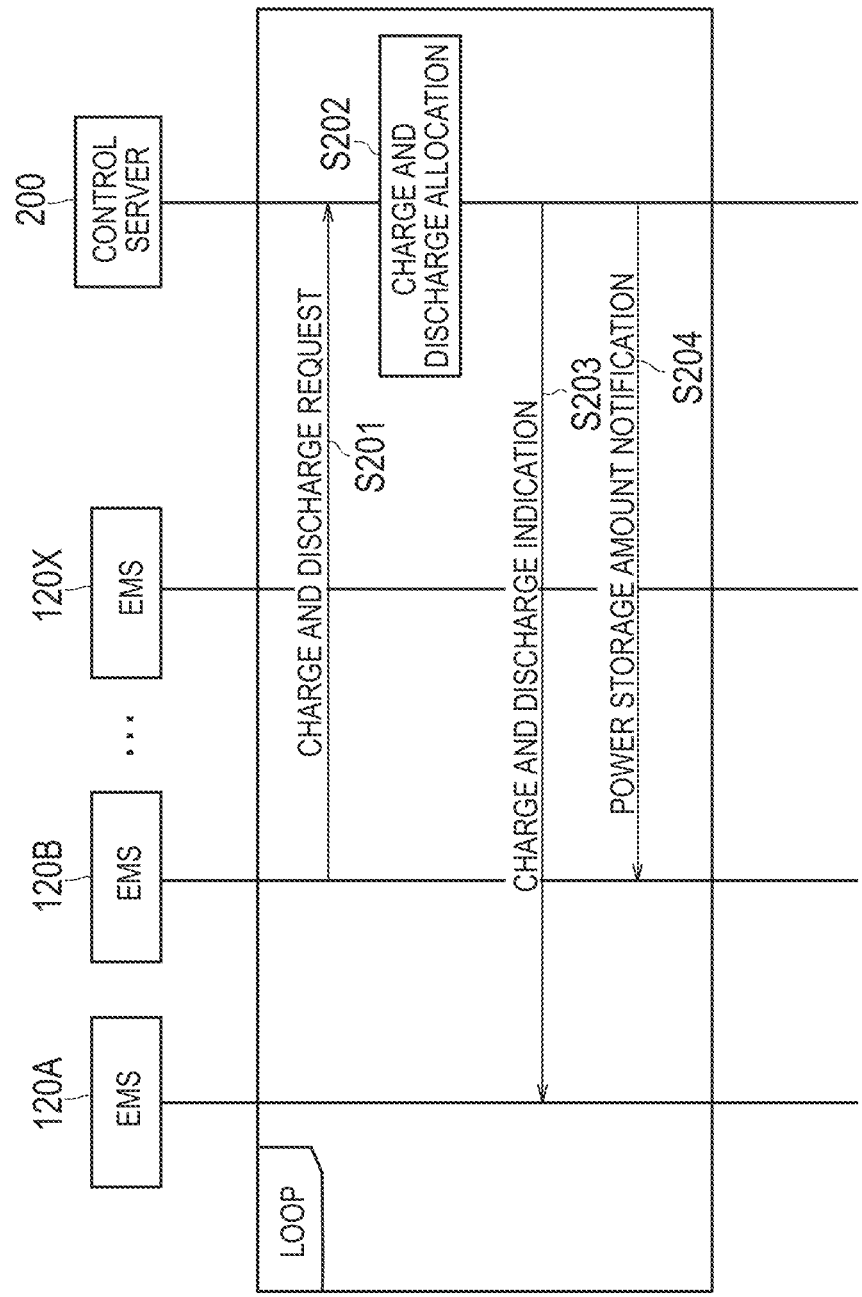

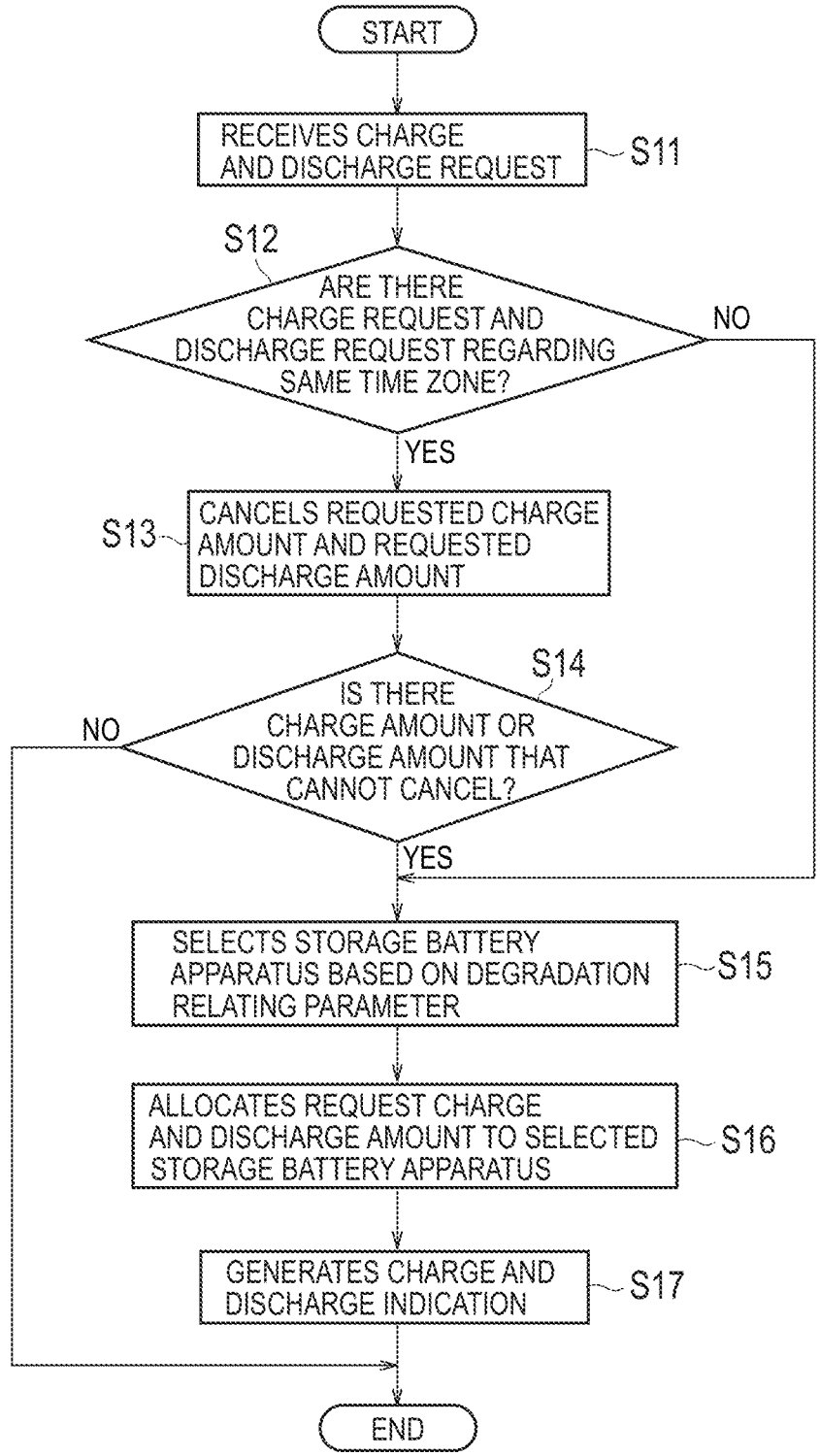

CONTROL APPARATUS AND CONTROL METHOD FOR CONTROLLING CHARGE AND DISCHARGE OF STORAGE BATTERY APPARATUSES

RELATED APPLICATIONS

The present application is a National Phase of International Application No. PCT/JP2019/031047, filed Aug. 7, 2019, and claims priority based on Japanese Patent Application No. 2018-148226, filed Aug. 7, 2018.

TECHNICAL FIELD

The present invention relates to a control apparatus and control method.

BACKGROUND ART

Currently, introduction of a storage battery apparatus is being promoted in a consumer facility such as a home, commercial facility, school, or the like, for purpose of disaster prevention, BCP, peak shaving, or the like. The storage battery apparatus is controlled by a control apparatus referred to as an EMS (Energy Management System) and performs charge and discharge for the purpose as needed.

Here, when there is a plurality of the customer's facilities having the storage battery apparatus, a way of use of the storage battery apparatus is not always optimized for the plurality of customer's facilities (community) as a whole, even when the EMS of each of the customer's facilities individually controls the storage battery apparatus in an optimized manner.

On the other hand, a control system controlling charge and discharge of a plurality of storage battery apparatuses belonging to different consumer's facilities is described in Patent Literature 1. The control system charges each of the storage battery apparatuses during nighttime power hours when an electricity charge is low and performs drive control to discharge sequentially each of the storage battery apparatuses each predetermined time during daytime when a power usage amount becomes high.

CITATION LIST

Patent Literature

Patent Literature 1: Japanese Application Publication No. 2003-299251

SUMMARY OF THE INVENTION

A control apparatus according to a first disclosure is an apparatus that controls charge and discharge of a plurality of storage battery apparatuses belonging to different consumer's facilities. The control apparatus includes at least one processor. The at least one processor is configured to execute: a reception process of receiving a request of charge or discharge to a target storage battery apparatus included in the plurality of storage battery apparatuses, and an allocation process of allocating, to the storage battery apparatus other than the target storage battery apparatus out of the plurality of storage battery apparatuses, at least a part of a request charge and discharge amount that is a charge amount or discharge amount corresponding to the request received by the reception process, so as to suppress deterioration of the target storage battery apparatus.

A control method according to a second disclosure includes controlling charge and discharge of a plurality of storage battery apparatuses belonging to different consumer's facilities. The controlling includes: receiving a request of charge or discharge to a target storage battery apparatus included in the plurality of storage battery apparatuses, and allocating, to the storage battery apparatus other than the target storage battery apparatus out of the plurality of storage battery apparatuses, at least a part of a request charge and discharge amount that is a charge amount or discharge amount corresponding to the received request, so as to suppress deterioration of the target storage battery apparatus.

BRIEF DESCRIPTION OF DRAWINGS

FIG. 6 is a diagram illustrating a second example of an operation sequence in a control system according to an embodiment.

FIG. 7 is a diagram illustrating an example a charge and discharge allocation flow (Step S103 of FIG. 5, Step S202 of FIG. 6) in a control system according to an embodiment.

DESCRIPTION OF EMBODIMENTS

A control system described in Patent Literature 1 merely perform charge and discharge control of each of storage battery apparatuses according to a predetermined and fixed charge and discharge plan and there is a problem that suppressing deterioration of each of the storage battery apparatuses is not taken into account.

Concretely, deterioration degree varies depending on a state of the storage battery apparatus even when same charge and discharge control is performed. For example, as a general characteristic of a lithium-ion battery, deterioration of the storage battery apparatus is smaller when a power storage amount is controlled at around 50% than when it is controlled near full or empty. Also, as for charge and discharge speed, the deterioration degree is smaller in a case of charging and discharging at low speed than in a case of rapid speed. Further, as for temperature, charge and discharge at high temperature or low temperature will lead to deterioration.

Then, the present disclosure is possible to suppress deterioration of each of the storage battery apparatuses, while controlling integrally charge and discharge of a plurality of storage battery apparatuses.

A control apparatus according to embodiments is an apparatus that controls charge and discharge of a plurality of storage battery apparatuses belonging to different consumer's facilities. The control apparatus includes at least one processor. The at least one processor executes a reception process of receiving a request of charge or discharge to a target storage battery apparatus included in the plurality of storage battery apparatuses, and an allocation process of allocating, to the storage battery apparatus other than the target storage battery apparatus out of the plurality of storage battery apparatuses, at least a part of a request charge and discharge amount which is a charge or discharge amount corresponding to the request received by the reception process, to suppress deterioration of the target battery storage apparatus.

It will be described with reference to the drawings about a control system according to an embodiment. Further, in the following description of the drawings, same or similar parts are marked with same or similar signs.

(Configuration of Control System)

Figure 1:
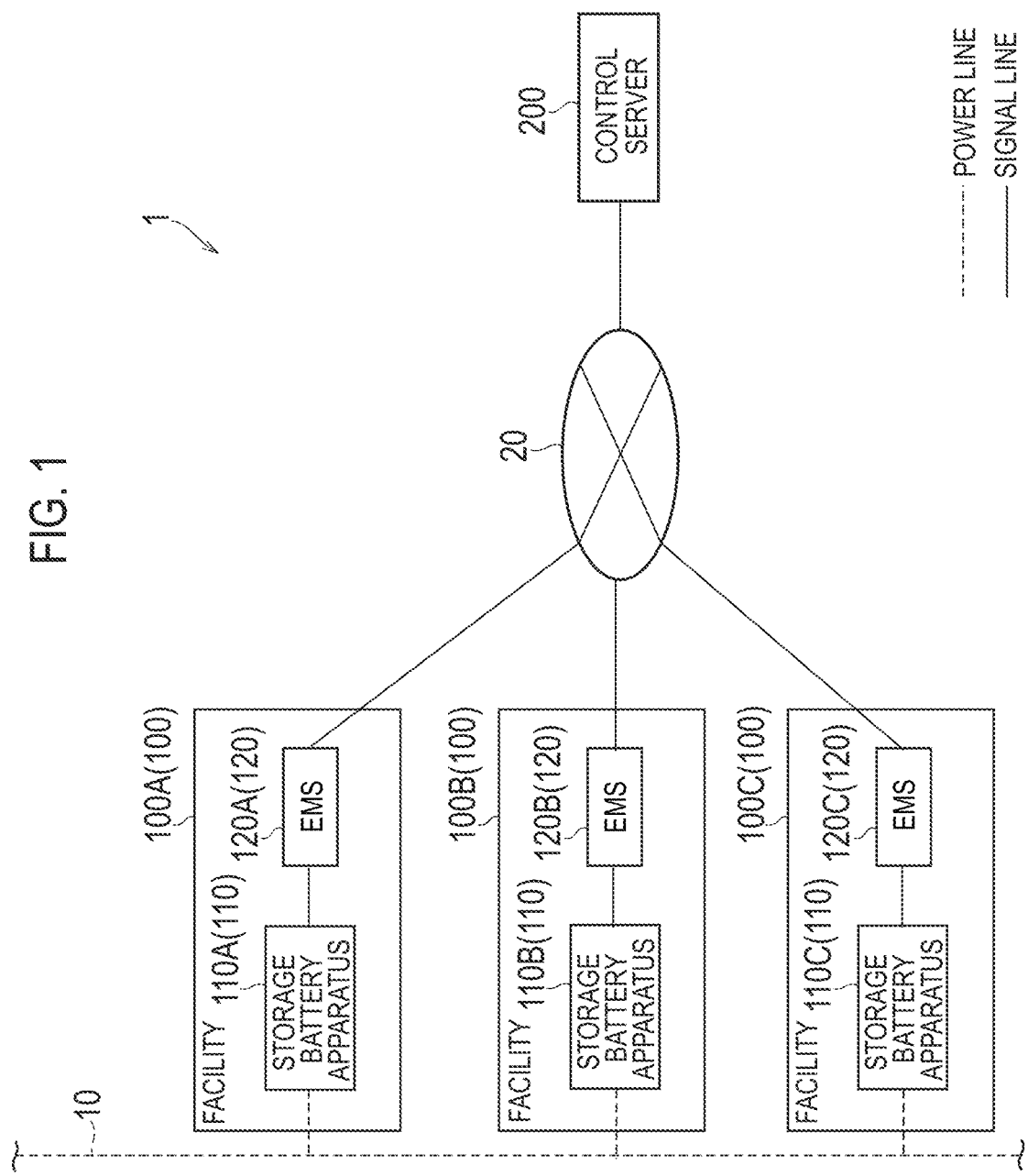
FIG. 1 is a diagram illustrating a configuration of a control system according to an embodiment.

FIG. 1 is a diagram illustrating a configuration of a control system 1 according to the present embodiment. As illustrated in FIG. 1, the control system 1 includes a plurality of facilities 100, and control server 200. Each of the facilities 100 and the control server 200 is connected to a communication network 20. The communication network 20 may include an internet or dedicated channel such as a VPN (Virtual Private Network) or the like.

In FIG. 1, as the plurality of facilities 100, facilities 100A to 100C are exemplified. One facility 100 corresponds to one consumer's facility. Each of the facilities 100 is connected to a power grid 10. A flow of power from the power grid 10 to the facility 100 is called to as a flow, and a flow of power from the facility 100 to the power grid 10 is called to as a backward flow. The power grid 10 may be a power transmission network outside of the consumer's facility in a case of power sharing between the consumer's facilities in a region separated from a power company.

The facility 100 includes a storage battery apparatus 110 and EMS (Energy Management System) 120.

The storage battery apparatus 110 is an apparatus that performs charge and discharge under control of the EMS 120. The storage battery apparatus 110 is a lithium-ion storage battery apparatus, lead storage battery apparatus, nickel-metal hydride storage battery apparatus, or the like. The storage battery apparatus 110 charges a power supplied from the power grid 10, for example. A power that the storage battery apparatus 110 discharges may be supplied to a load device in the facility 100 or to the power grid 10.

The EMS 120 is an apparatus that manages a power of the facility 100 (consumer's facility). The EMS 120 is an example of a management apparatus managing the power of the consumer's facility. The EMS 120 creates a control plan controlling charge and discharge of the storage battery apparatus 110 of the facility 100 corresponding to power demand of the facility 100. The EMS 120 creates the control plan optimized in the facility 100. The EMS 120 transmits a charge and discharge request to the control server 200 according to the created control plan. At this time, the EMS 120 cannot request more than capability of the storage battery apparatus 110 of the facility 100 (capacity, output, or power storage amount).

The control server 200 is an apparatus that controls integrally charge and discharge of the storage battery apparatus 110 of the facility 100. The control server 200 is an example of a control apparatus controlling the charge and discharge of a plurality of the storage battery apparatuses 110 belonging to different consumer's facilities. For example, the control server 200 is managed by a power generation operator, a power transmission and distribution business operator, or power operator such as a retailer or the like.

In the present embodiment, a plurality of the consumer's facilities corresponding to the plurality of facilities 100 has a contract to the power operator corresponding to the control server 200, and a power community is formed by the plurality of consumer's facilities and the power operator. In the power community, the plurality of consumer's facility can utilize each of the storage battery apparatuses 110 each other. Concretely, it is possible to perform allocation of the charge and discharge such that the storage battery apparatus 110 of one facility 100 performs charge and discharge to a charge and discharge request to the storage battery apparatus 110 of the other facility 100. Here, in whole of the power community, even when the storage battery apparatus 110 is utilized with each other, a total flow amount or total backward flow amount of the whole of the power community is same as that the storage battery apparatus 110 is not be utilized with each other.

The control server 200 allocates at least a part of a requested charge amount or discharge amount to the storage battery apparatus 110 other than a target storage battery apparatus so as to suppress deterioration of the target storage battery apparatus to which charge or discharge is requested. Concretely, the control server 200 allocates, to at least one the storage battery apparatus out of the plurality of storage battery apparatuses 110, a request charge and discharge amount which is a charge amount or discharge amount corresponding to a charge and discharge request, based on the charge and discharge request received from the EMS 120. Herewith, it is possible to suppress deterioration of each of the storage battery apparatuses 110 by utilizing an optimum storage battery apparatus 110 with each other, in the whole of the power community.

And, the control server 200 transmits, to the EMS 120 corresponding to the storage battery apparatus 110, a control message (charge and discharge instruction) indicating control to the storage battery apparatus 110 to which the request charge and discharge is allocated. Here, the control server 200 may transmit a flow control message requesting control of the flow (for example, DR; Demand Response), or a backward flow control message requesting control of the backward flow. Control degree of the flow or the backward flow may be represented by an absolute value (for example, ○○kW), or a relative value (for example, ○○%). The EMS 120 controls the storage battery apparatus 110 according to the control message.

Communication between the control server 200 and EMS 120 can use a protocol conforming to the Open ADR (Automated Demand Response) or an original dedicated protocol.

(Configuration of Control Server)

Figure 2:
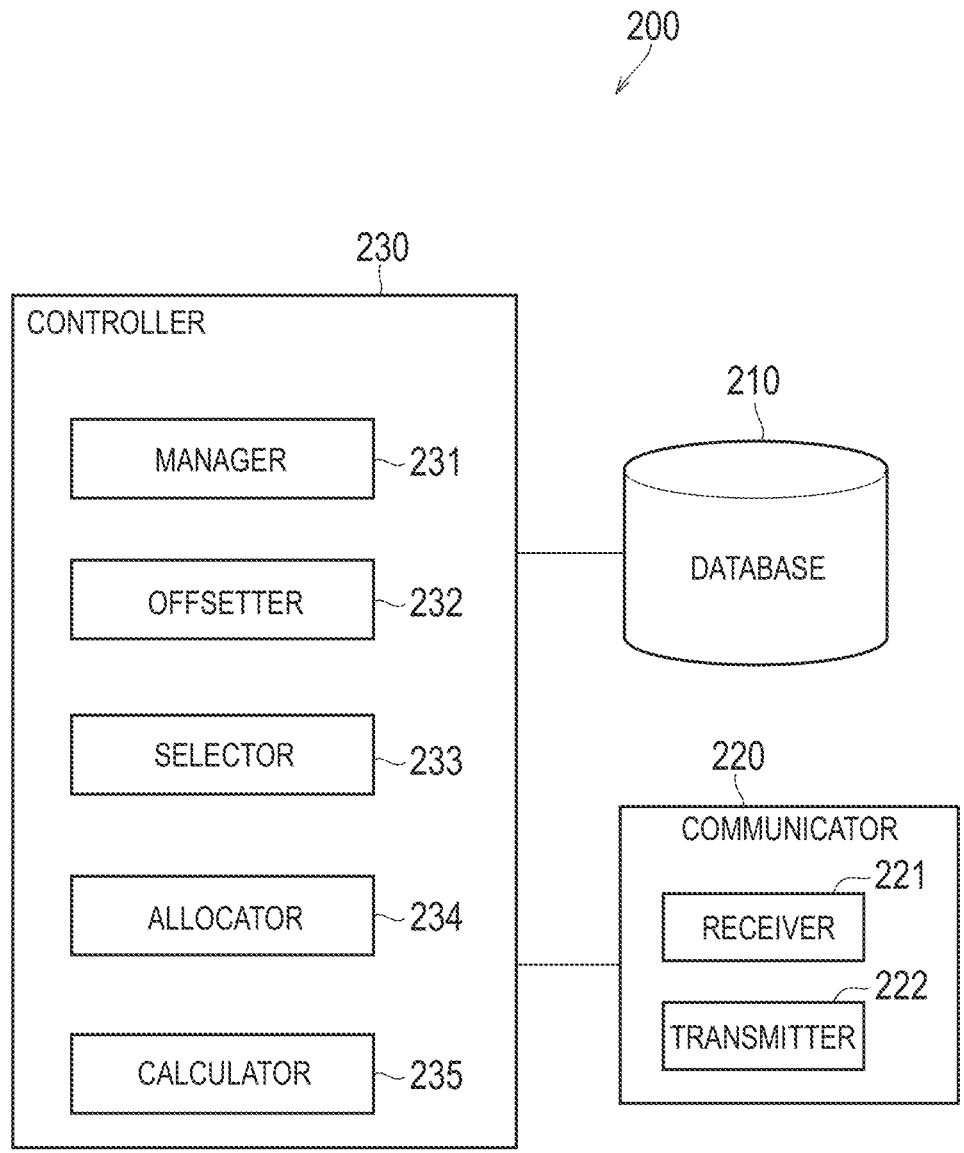
FIG. 2 is a diagram illustrating a configuration of a control server according to an embodiment.

FIG. 2 is a diagram illustrating a configuration of the control server 200 according to the present embodiment. As illustrated in FIG. 2, the control server 200 includes a database 210, communicator 220, and controller 230.

Figures 3, 4:
FIG. 3 is a diagram illustrating an example of data regarding to each of storage battery apparatuses in which a database according to an embodiment stores.
FIG. 4 is a diagram illustrating an example of a charge and discharge request message according to an embodiment.

The database 210 is configured by a storage medium such as a memory or/and HDD (Hard Disk Drive), or the like, and stores information and data used for control and process of the controller 230. The database 210 stores data regarding to each of the storage battery apparatuses 110. FIG. 3 is a diagram illustrating an example of the data regarding to each of the storage battery apparatuses 110 stored in the database 210. As illustrated in FIG. 3, the data regarding to each of the storage battery apparatuses 110 includes ID of the storage battery apparatus, charge rate (SOC: State of Charge) of the storage battery apparatus 110, temperature of the storage battery apparatus 110, deterioration degree (SOH: State of Health) of the storage battery apparatus 110, real power storage amount of the storage battery apparatus 110, and virtual power storage amount of the storage battery apparatus 110. Here, the real power storage amount is a real power storage amount of a result that the storage battery apparatus 110 is utilized with each other. On the other hand, the virtual power storage amount is a virtual power storage amount in a case of assuming that the storage battery apparatus 110 is not utilized with each other. The data regarding to each of the storage battery apparatuses 110 may include a number of charge and discharge cycles of the storage battery apparatus 110, furthermore.

The communicator 220 is configured by a communication module, and performs communication with the EMS 120. The communicator 220 includes a receiver 221 and transmitter 222.

The receiver 221 receives a message including information indicating usage of the storage battery apparatus 110 from the EMS 120. The receiver 221 may receive the message from the EMS 120 periodically. The information indicating the usage of the storage battery apparatus 110 includes a charge rate (SOC: State of Charge) of the storage battery apparatus 110, temperature of the storage battery apparatus 110, deterioration degree (SOH: State of Health) of the storage battery apparatus 110, at least one information of a real power storage amount of the storage battery apparatus 110 and virtual power storage amount of the storage battery apparatus 110, or information for specifying the information.

Further, the receiver 221 receives, from the EMS 120, a charge and discharge request which is a request of charge or discharge of the storage battery apparatus 110 FIG. 4 is a diagram illustrating an example of the charge and discharge request message. As illustrated in FIG. 4, the charge and discharge request message includes an information element indicating a time (control time) executing charge or discharge to a target storage battery apparatus, information element indicating control content whether the charge or discharge is requested, and information element indicating a request charge and discharge amount (control amount) [kWh]. The control time includes start time and end time. The control time may be a time zone at every 30 minutes. The control content is charge or discharge as a control content within the control time. The control amount is a charge amount or discharge amount.

The receiver 221 may receive a message from the EMS 120 via a data collection server or the message from the EMS 120 not via the data collection server.

The transmitter 222 transmits, to the EMS 120 corresponding to the storage battery apparatus 110, a control message (charge and discharge instruction) instructing control to the storage battery apparatus 110 to which the request charge and discharge amount is allocated.

The controller 230 is configured by a CPU (Central Processing Unit) or the like, and controls each of configurations included in the control server 200. The controller 230 includes a manager 231, offsetter 232, selector 233, allocator 234, and calculator 235. The manager 231, offsetter 232, selector 233, allocator 234, and calculator 235 may be configured by one CPU or configured by a plurality of CPUs.

The manager 231 manages the data regarding to each of the storage battery apparatuses 110 (referring to FIG. 3). Concretely, when the receiver 221 receives the message including the information indicating the usage of the storage battery apparatus 110, the manager 231 controls the database 210 so as to update the data regarding to the storage battery apparatus 110 based on the information.

When the receiver 221 receives both of the request of charge and request of discharge to two or more the target storage battery apparatuses, the offsetter 232 offsets a charge amount corresponding to the request of charge and discharge amount corresponding to the request of discharge. The offsetter 232 may perform the offset, only when the receiver 221 receives the both of the request of charge and request of discharge regarding to a same timing (time zone). For example, when, at a certain time zone, discharge of 10 kWh from the storage battery apparatus 110A of the facility 100A is requested, charge of 3 kWh to the storage battery apparatus 110B of the facility 100B is requested, and charge of 4 kWh to the storage battery apparatus 110C of the facility 100C is requested, discharge of 3 kWh (10 kWh-3 kWh-4 kWh=3 kWh) is requested from the storage battery apparatuses A to C, by offset. As a result, a discharge amount 3 kWh remaining without being offset by the offsetter 232 becomes the request charge and discharge amount. It is possible to suppress deterioration of each of the storage battery apparatuses 110 since an amount or a number of charge and discharge of the storage battery apparatus 110 can be reduced by the offset.

The selector 233 selects at least one storage battery apparatus 110 that causes to execute charge or discharge according to the charge and discharge request message received by the receiver 221 based on a parameter relating to deterioration of each of the storage battery apparatuses 110 (hereinafter, referred to as "deterioration related parameter").

The deterioration related parameter may include a charge rate (SOC) of each of the storage battery apparatuses 110. The selector 233 may select at least one storage battery apparatus 110 that causes to execute charge and discharge so that the SOC of each of the storage battery apparatuses 110 brings to a target SOC. For example, the selector 233 performs selection so that the SOC of each of the storage battery apparatuses 110 brings closer to around 50%. When the selector 233 selects the storage battery apparatus 110 that causes to execute charge, the selector 233 may select the storage battery apparatus 110 that the SOC is closer to empty (for example, equal to or less than 10%). When the selector 233 selects the storage battery apparatus 110 that causes to execute discharge, the selector 233 may select the storage battery apparatus 110 that the SOC is closer to full charge (for example, equal to or more than 90%). Or, the selector 233 may select the storage battery apparatus 110 that the SOC is closest to the target SOC (for example, close to around 50%) preferentially. By performing selection that takes such the SOC into consideration, it is possible to suppress deterioration of the each of the storage battery apparatuses 110.

The deterioration related parameter may include temperature of each of the storage battery apparatuses 110. Here, the temperature may be temperature of inside of the storage battery apparatus 110 (for example, storage battery cell) or temperature around of the storage battery apparatus 110. The selector 233 may select at least one storage battery apparatus 110 out of the storage battery apparatus 110 that the temperature is equal to or more than a first threshold value and/or the storage battery apparatus 110 other than the storage battery apparatus 110 that the temperature is equal to or less than a second threshold value, out of the plurality of storage battery apparatuses 110. The first and second threshold values are predetermined according to characteristic of the storage battery apparatus 110. By performing selection that takes such the temperature into consideration, it is possible to suppress deterioration of each of the storage battery apparatuses 110.

The deterioration related parameter may include a number of charge and discharge cycles or deterioration degree (SOH) of each of the storage battery apparatuses 110. The selector 233 selects the storage battery apparatus 110 that is the smallest number of charge and discharge cycles or the storage battery apparatus 110 that is the least deterioration degree (SOH), preferentially. By performing selection that takes such the number of charge and discharge cycles or the SOH into consideration, it is possible to suppress deterioration of each of the storage battery apparatuses 110 and reduce that life of specific the storage battery apparatus 110 expired early.

The selector 233 may perform selection of the storage battery apparatus 110 by combining a plurality of the deterioration related parameters. For example, the selector 233 may select the storage battery apparatus 110 that the SOC is close to the target SOC (for example, around 50%) and the deterioration degree (SOH) is small, out of the storage battery apparatus 110 that the temperature is equal to or more than the first threshold value and/or the storage battery apparatus 110 other than the storage battery apparatus 110 that the temperature is equal to or less than the second threshold value.

The allocator 234 allocates at least a part of the request charge and discharge amount to the storage battery apparatus 110 other than the target storage battery apparatus out of the plurality of storage battery apparatuses 110, so as to suppress deterioration of the target storage battery apparatus to which charge or discharge is requested. Concretely, the allocator 234 allocates the request charge and discharge amount to the storage battery apparatus 110 selected by the selector 233.

Or, the allocator 234 may perform charge and discharge allocation by distributing the charge amount or discharge amount to all storage battery apparatuses 110 equally. In this case, the allocator 234 may allocate the charge amount or discharge amount multiplied by a capability ratio (capacity ratio, output ratio, or power storage amount ratio) of each of the storage battery apparatuses 110.

When the offsetter 232 performs offset, the allocator 234 performs the charge and discharge allocation to the charge amount or discharge amount remaining without being offset by the offsetter 232 as a request charge and discharge amount after offset. However, when the charge and discharge amount is zero by the offset, the allocator 234 does not perform the charge and discharge allocation since the request charge and discharge amount becomes zero, too. As a result, any of the storage battery apparatus 110 does not perform charge and discharge.

The allocator 234 generates a control message (charge and discharge instruction) addressed to the EMS 120 corresponding to the storage battery apparatus 110 to which the request charge and discharge amount is allocated by the charge and discharge allocation. The transmitter 222 transmits the control message (charge and discharge instruction) generated by the allocator 234 to the EMS 120.

The calculator 235 calculates a virtual power storage amount of the target storage battery apparatus, when the allocator 234 allocates at least the part of the request charge and discharge amount to the storage battery apparatus 110 other than the target storage battery apparatus. For example, when a charge amount or discharge amount is allocated to the storage battery apparatus 110B of the facility 100B to the charge and discharge request of the storage battery apparatus 110A of the facility 100A, though a power storage amount of the storage battery apparatus 110B of the facility 100B increases or decreases practically, the calculator 235 assumes that the power storage amount of the storage battery apparatus 110A of the facility 100A increases or decreases virtually and calculates the virtual power storage amount of the storage battery apparatus 110A. That is, when the allocator 234 allocates at least the part of the request charge and discharge amount to the storage battery apparatus 110 other than the target storage battery apparatus (that is, when the storage battery apparatus 110 is utilized with each other), the calculator 235 calculates the virtual power storage amount reflecting entire of the request charge and discharge amount corresponding to the charge and discharge request of the storage battery apparatus 110A. The calculated virtual power storage amount is stored in the database 210, and is used for calculation of an electricity charge of the consumer's facility corresponding to the facility 100A.

(Operation Example of Control System)

Figure 5:
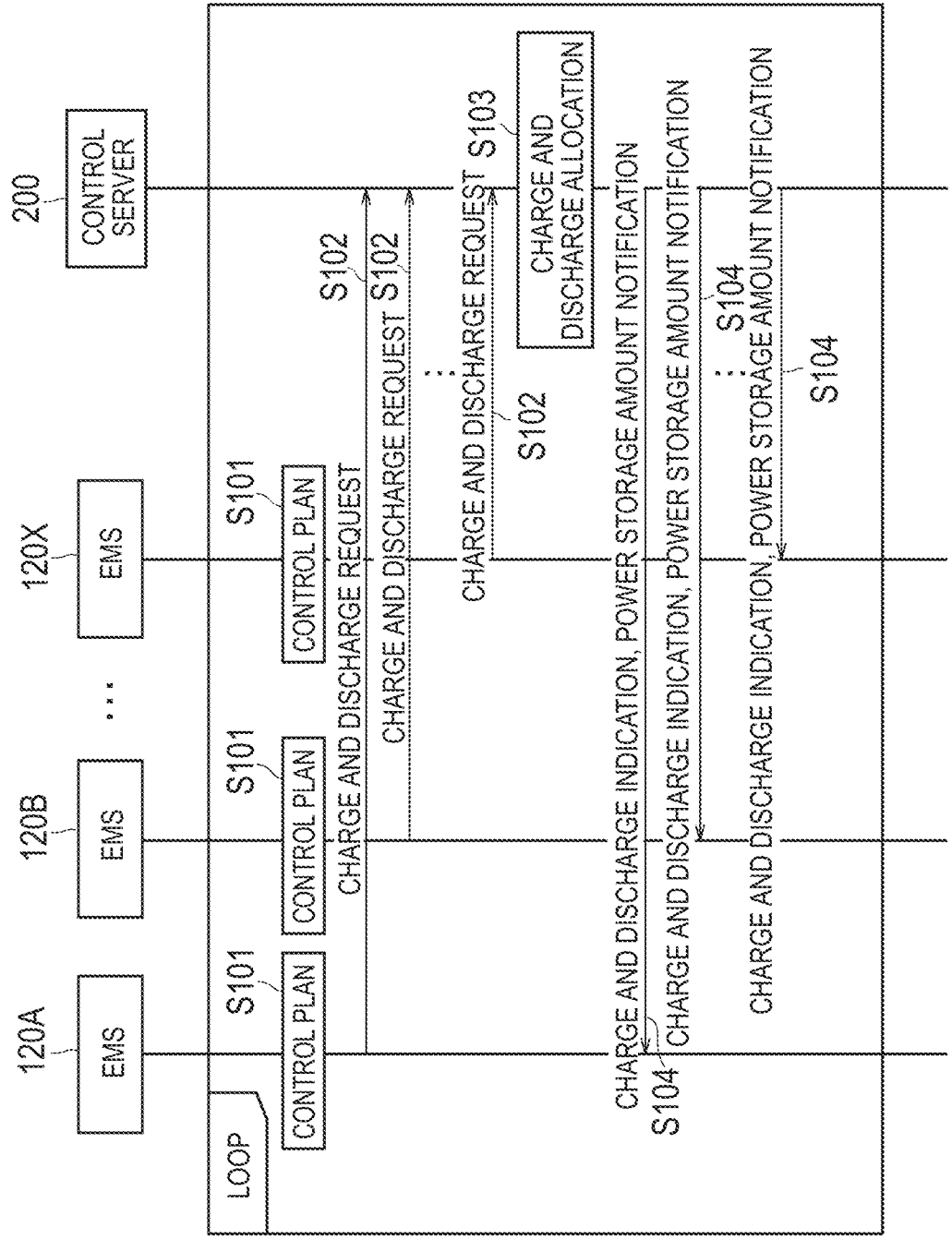
FIG. 5 is a diagram illustrating a first example of an operation sequence in a control system according to an embodiment.

FIG. 5 is a diagram illustrating a first example of an operation sequence in the control system 1 according to the present embodiment. In the first example, a control plan in the facility 100 (EMS 120), charge and discharge allocation in the control server 200, and charge and discharge control are repeated at a predetermined time period.

As illustrated in FIG. 5, in Step S101, the EMS 120 of each of the facilities 100 creates a charge and discharge control plan of the storage battery apparatus 110 of the own facility 100, and generates the charge and discharge request message (referring to FIG. 4) according to the created charge and discharge control plan.

In Step S102, the EMS 120 of each of the facilities 100 transmits the generated charge and discharge request message to the control server 200.

In Step S103, the control server 200 performs the charge and discharge allocation so as to utilize the optimum storage battery apparatus 110 with each other based on the charge and discharge request message received from the EMS 120 of each of the facilities 100.

In Step S104, the control server 200 transmits a control message (charge and discharge instruction) based on a result of the charge and discharge allocation. In FIG. 5, an example that the control server 200 transmits the charge and discharge instruction to the EMS 120 of each of the facilities 100 is exemplified. The charge and discharge instruction includes information indicating charge and discharge or a discharge amount allocated by the charge and discharge allocation. The charge and discharge instruction may include information indicating a virtual power storage amount reflecting the result of charge and discharge allocation.

Processes of Step S101 to Step S104 are repeated at a predetermined time period.

FIG. 6 is a diagram illustrating a second example of an operation sequence in the control system 1 according to the present embodiment. In the second example, a charge and discharge request occurs in an arbitrary timing.

As illustrated in FIG. 6, in Step 201, the EMS 120B of the facility 100B determines to perform charge or discharge of the storage battery apparatus 110B of the facility 100B, and notifies it's content as a charge and discharge request message to the control server 200.

In Step S202, the control server 200 performs charge and discharge allocation so as to utilize the optimum storage battery apparatus 110 with each other. Here, it will be described on the assumption that the control server 200 determines that the storage battery apparatus 110A of the facility 100A is optimal.

In Step S203, the control server 200 performs charge and discharge instruction to the EMS 120 of the facility 100A.

In Step S204, the control server 200 notifies, to the EMS 120B of the facility 100B, a virtual power storage amount of the storage battery apparatus 110B of the facility 100B to which a result of the charge and discharge allocation is reflected.

FIG. 7 is a diagram illustrating an example of a charge and discharge allocation flow (Step S103 of FIG. 5, Step S202 of FIG. 6) in the control system 1 according to the present embodiment.

As illustrated in FIG. 7, in Step S11, the receiver 221 of the control server 200 receives the charge and discharge request message from one or a plurality of the EMSs 120.

In Step S12, the offsetter 232 of the control server 200 determines whether or not there are both of a charge request and discharge request to two or more target storage battery apparatuses at a same timing (time zone) based on a receiving content of the receiver 221. In a case of "NO" in Step S12, the process proceeds to Step S15.

In a case of "YES" in step S12, in Step S13, the offsetter 232 of the control server 200 offsets a charge amount corresponding to the charge request and discharge amount corresponding to the discharge request. In a case that there is a charge amount or discharge amount which could not be offset (Step S14: YES), that is, when a requested total charge amount and requested total discharge amount do not match, the process proceeds to Step S15. On the other hand, when the charge amount and discharge amount are all offset (Step S14: NO), that is, the requested total charge amount and requested total discharge amount matches, the present flow processes.

In Step S15, the selector 233 of the control server 200 selects at least one storage battery apparatus 110 that causes to execute charge or discharge, based on a deterioration related parameter of each of the storage battery apparatuses 110.

In Step S16, the allocator 234 of the control server 200 allocates a request charge and discharge amount to the storage battery apparatus 110 selected by the selector 233.

In Step S17, the allocator 234 of the control server 200 generates a control message (charge and discharge instruction) addressed to the EMS 120 corresponding to the storage battery apparatus 110 to which the request charge and discharge amount is allocated. The transmitter 222 of the control server 200 transmits the generated control message (charge and discharge instruction) to the EMS 120.

SUMMARIES OF EMBODIMENTS

According to the present embodiment, the control server 200 that controls the charge and discharge amount of the plurality of storage battery apparatuses 110 belonging to different consumer's facilities includes the receiver 221 configured to receive the request of charge or discharge to the target storage battery apparatus included in the plurality of storage battery apparatuses 110, and the allocator 234 configured to allocate, to the storage battery apparatus 110 other than the target storage battery apparatus out of the plurality of storage battery apparatuses 110, at least the part of the request charge and discharge amount that is the charge amount or discharge amount corresponding to the request received by the receiver 221, so as to suppress deterioration of the target storage battery apparatus. Herewith, it is possible to control integrally the charge and discharge of the plurality of storage battery apparatuses 110 and suppress deterioration of each of the storage battery apparatuses 110.

MODIFIED EXAMPLES

In the above embodiments, though charge and discharge speed is not be mentioned in particular, the control server 200 may perform the charge and discharge allocation in consideration of the charge and discharge speed. For example, when the charge and discharge speed which is speed of charge or discharge corresponding to the charge and discharge request message received by the receiver 221 is equal to or more than predetermined speed, the allocator 234 of the control server 200 may allocate the request charge and discharge amount to 2 or more the storage battery apparatus 110 that causes to execute charge or discharge separately, so as to reduce the charge and discharge speed. Here, the charge and discharge speed is determined by size of a control amount with respect to time length of control time. By causing to execute charge or discharge to 2 or more the storage battery apparatus 110 separately, since it is possible to reduce the charge and discharge speed of each of the storage battery apparatuses 110, it is possible to suppress deterioration of each of the storage battery apparatuses 110.

OTHER EMBODIMENTS

In the above embodiments, though it is exemplified about the example of performing centralized control by the control server 200, it may be configured to perform distributed control by the EMS 120. In this case, each of the EMSs 120 transmits the charge and discharge request message to the other EMS 120, and each of the EMSs 120 performs the charge and discharge allocation based on the charge and discharge request message. In the configuration of performing the distributed control, a control apparatus that controls charge and discharge of a storage battery apparatus may be the EMS 120.

In the above embodiments, though it is not be mentioned about VPP (Virtual Power Plant) control in particular, the VPP control may be performed in a preliminary stage of the operation according to the above embodiments. For example, a VPP server transmits a message requesting charge and discharge of the storage battery apparatus 110 to the EMS 120, and the EMS 120 transmits the charge and discharge request message to the control server 200 based on the message received from the VPP server. Or, the VPP server may transmit the charge and discharge request message to the control server 200 not via the EMS 120.

Further, in a case that the VPP control is performed, the operation according to the above embodiments may be applied in every facility group of a VPP control target. Mutual utilization of the storage battery apparatuses 110 only within the facility 100 belonging to the facility group of the VPP control target may be approved. Further, in the case that the VPP control is performed, capacity for the VPP control may be secured in each of the storage battery apparatuses 110.

In the above embodiment, though the control server 200 includes the database 210, it is not limited to this. The database 210 may be a cloud server installed on an internet.

Though it is not be mentioned in the above embodiments in particular, the EMS 120 does not necessarily have to be provided within the facility 100. For example, a part of functions of the EMS 120 may be provided by the cloud server installed on the internet. That is, it may be considered that the EMS 120 includes the cloud server. Further, the EMS 120 may be substituted by a configuration of a part within the storage battery apparatus 110.

Though it is not be mentioned in the above embodiments in particular, the storage battery apparatus 110 does not necessarily have to be provided within the facility 100. The storage battery apparatus 110 may be provided outside of the facility 100.

Though it is described with reference to the drawings about the embodiments in details, concrete configuration is not limited to the above, and various design changes or the like are possible without deviating from the gist of the invention.

This application claims priority to Japanese application publication No. 2018-148226 (filed on Aug. 7, 2018), which is incorporated by reference herein in their entity.

The invention claimed is:

1. A control apparatus, comprising:
at least one processor configured to control charge and discharge of a plurality of storage battery apparatuses belonging to different consumer's facilities, wherein
the at least one processor is configured to execute:
a reception process of receiving a request of charge or discharge to a first storage battery apparatus included in the plurality of storage battery apparatuses, and
an allocation process of allocating, to a second storage battery apparatus other than the first storage battery apparatus out of the plurality of storage battery apparatuses, at least a part of a request charge and discharge amount that is a charge amount or discharge amount corresponding to the request received by the reception process, so as to suppress deterioration of the first storage battery apparatus,
wherein
the second storage battery apparatus is a storage battery apparatus to which the request of the charge of the discharge is not received by the reception process,
the at least one processor is configured to execute: an offset process of offsetting a charge amount corresponding to the request of charge with respect to a discharge amount corresponding to the request of discharge for two or more first storage battery apparatuses when both of the request of charge and request of discharge to the two or more first storage battery apparatuses are received by the reception process, and
the allocation process further includes a process of allocating, to at least one storage battery apparatus of the plurality of storage battery apparatuses, a charge amount or discharge amount remaining without being offset by the offset process as a request charge and discharge amount after offset.

2. A control method comprising:
controlling charge and discharge of a plurality of storage battery apparatuses belonging to different consumer's facilities, wherein
the controlling includes:
receiving a request of charge or discharge to a target storage battery apparatus included in the plurality of storage battery apparatuses, and
allocating, to a storage battery apparatus other than the target storage battery apparatus out of the plurality of storage battery apparatuses, at least a part of a request charge and discharge amount that is a charge amount or discharge amount corresponding to the received request, so as to suppress deterioration of the target storage battery apparatus,
wherein
the controlling further includes: offsetting a charge amount corresponding to the request of charge with respect to a discharge amount corresponding to the request of discharge for two or more target storage battery apparatuses when both of the request of charge and request of discharge to the two or more target storage battery apparatuses are received at the receiving, and the allocating includes allocating, to at least one storage battery apparatus of the plurality of storage battery apparatuses, a charge amount or discharge amount remaining without being offset at the offsetting as a request charge and discharge amount after offset.

3. A control apparatus, comprising:
at least one processor configured to control charge and discharge of a plurality of storage battery apparatuses belonging to different consumer's facilities, wherein
the at least one processor is configured to execute:
a reception process of receiving a request of charge or discharge to a target storage battery apparatus included in the plurality of storage battery apparatuses, and
an allocation process of allocating, to the storage battery apparatus other than the target storage battery apparatus out of the plurality of storage battery apparatuses, at least a part of a request charge and discharge amount that is a charge amount or discharge amount corresponding to the request received by the reception process, so as to suppress deterioration of the target storage battery apparatus,
wherein
the at least one processor is configured to execute: an offset process of offsetting a charge amount corresponding to the request of charge with respect to a discharge amount corresponding to the request of discharge for two or more target storage battery apparatuses when both of the request of charge and request of discharge to the two or more target storage battery apparatuses are received by the reception process, and
the allocation process further includes a process of allocating, to at least one storage battery apparatus of the plurality of storage battery apparatuses, a charge amount or discharge amount remaining without being offset by the offset process as a request charge and discharge amount after offset.

4. The control apparatus according to claim 3, wherein
the reception process includes a process of receiving the request of charge or discharge to the target storage battery apparatus from a management apparatus managing power of the consumer's facility to which the target storage battery apparatus belongs.

5. The control apparatus according to claim 3, wherein
the at least one processor is configured to execute: a selection process of selecting at least one storage battery apparatus to execute charge or discharge according to the request received by the reception process based on a parameter relating to deterioration of each of the plurality of storage battery apparatuses, and
the allocation process further includes a process of allocating the request charge and discharge amount to the at least one storage battery apparatus selected by the selection process.

6. The control apparatus according to claim 5, wherein
the parameter includes a charge rate of each of the plurality of storage battery apparatuses, and
the selection process further includes a process of selecting at least one storage battery apparatus so as to bring the respective charge rate of the plurality of storage battery apparatuses closer to a target charge rate.

7. The control apparatus according to claim 5, wherein
the parameter includes a charge rate of the plurality of storage battery apparatuses respectively, and
the selection process includes a process of selecting a storage battery apparatus at which the charge rate is the closest to a target charge rate out of the plurality of the storage battery apparatuses.

8. The control apparatus according to claim 5, wherein the parameter includes temperature of the plurality of storage battery apparatuses respectively, and the selection process includes a process of selecting, out of the plurality of storage battery apparatuses, the at least one storage battery apparatus to be other than a storage battery apparatus where the temperature is equal to or more than a first threshold value, and/or a storage battery apparatus where the temperature is equal to or less than a second threshold value.

9. The control apparatus according to claim 5, wherein the parameter includes a number of charge and discharge cycles or deterioration degree of each of the plurality of storage battery apparatuses, and the selection process further includes a process of selecting the at least one storage battery apparatus to include a storage battery apparatus with the smallest number of charge and discharge cycles, or a storage battery apparatus with the least deterioration degree.

10. The control apparatus according to claim 3, wherein the allocation process includes a process of allocating the request charge and discharge amount to two or more storage battery apparatuses among the plurality of storage battery apparatuses to cause the two or more storage battery apparatuses to execute charge or discharge separately to reduce charge and discharge speed, when the charge and discharge speed that is speed of charge or discharge corresponding to the request received by the reception process is equal to or more than predetermined speed.

11. The control apparatus according to claim 3, wherein the at least one processor is configured to execute: a calculation process of calculating a virtual power storage amount of the target storage battery apparatus, when the at least part of the request charge and discharge amount is allocated to the storage battery apparatus other than the target storage battery apparatus out of the plurality of storage battery apparatuses, the virtual power storage amount being a power storage amount of the target storage battery apparatus in a case that the at least part of the request charge and discharge amount is not allocated to the storage battery apparatus other than the target storage battery apparatus out of the plurality of storage battery apparatuses, and the at least one processor is configured to use the virtual power storage amount for calculation of an electricity charge of the consumer's facility belonging to the target storage battery apparatus.

12. The control apparatus according to claim 3, wherein the reception process includes a process of receiving a message including an information element indicating time executing charge or discharge to the target storage battery apparatus, information element indicating whether charge or discharge is requested, and information element indicating the request charge and discharge amount.

* * * * *